March 30, 1926.

S. L. LEBBY

METHOD OF PRESSING GLASS

Filed July 16, 1925

1,578,448

Inventor,
States Lee Lebby,
by
Dorsey & Cole
Attorneys.

Patented Mar. 30, 1926.

1,578,448

UNITED STATES PATENT OFFICE.

STATES LEE LEBBY, OF CORNING, NEW YORK.

METHOD OF PRESSING GLASS.

Application filed July 16, 1925. Serial No. 44,075.

*To all whom it may concern:*

Be it known that I, STATES LEE LEBBY, a citizen of the United States of America, and a resident of Corning, New York, have invented certain new and useful Improvements in Methods of Pressing Glass, of which the following is a specification.

This invention is an improvement in a method of pressing glass blanks, more particularly blanks which are to be used in the making of light projection mirrors.

The principal object of the invention is to provide a method of pressing glass which will prevent "suck" in the finished blank, i. e., will prevent contraction of the pressed surfaces of the blank, as it cools, away from the mold surfaces.

A further object is to provide a method of pressing glass which will eliminate the matted appearance of the pressed surfaces.

These objects are accomplished by making good the contraction in volume of the blank, by flow of glass from a zone which forms no part of the effective pressed surfaces of the blank, and which is free of contact with any part of the blank forming mechanism, and hence unchilled.

In the manufacture of glass blanks for optical use, and in the particular instance noted, in the manufacture of glass blanks for use as katadioptric light projectors, it has heretofore been customary to use, in combination with the mold and the plunger, a neck ring which closed the space at the upper part of the mold and between it and the plunger, which neck ring formed with the plunger and mold, a cavity, into which the glass charge was pressed. The charge ordinarily has been pressed upwardly into the cavity and against the under side of the neck ring and as the plunger further descended all surfaces of the glass blank were brought into contact with pressing surfaces and chilled thereby.

In cases where an excess amount of glass had been placed in the mold, the surfaces of the blank became matted by being forced into the pores of the pressing surfaces.

A serious difficulty was encountered in this method of pressing, in that the glass would "suck" or contract in certain zones away from the surfaces of the plunger and the mold, in cooling, with the result that the pressed surfaces in the blank, instead of conforming to the shape of the plunger on the one side, and the mold on the other, varied in places from such true shape with the result that in the finished mirror the surfaces, instead of being truly optical, were in portions imperfect. Tests which I have made, have shown that these "sucks" often times depart from correct optical curvature as much as 100 per cent, so that a large proportion of mirrors pressed by the ordinary method were useless for optical purposes, in the condition that they came from the molds. Heretofore, it has been customary, in order to render the blanks fit for use, to grind and polish both the inner and outer surfaces thereof.

My method of pressing obviates these difficulties and results in the blanks conforming truly to the shape of the plunger and mold in their finished condition, and eliminates the necessity of either grinding or polishing the surfaces of the blank.

A further material advantage of my invention is that certain optical surfaces, which can not accurately and economically be produced by grinding and polishing, can be produced by my pressing method. For instance, it is well known in the art, that a katadioptric projecting mirror having a parabolic surface can be ground and polished only at great expense and with difficulty, and then only imperfectly.

As an illustrated example of my invention, I will describe the method, and the means utilized in the production of concavo-convex projecting mirror blanks.

In the accompanying drawing,—

Figure 1:
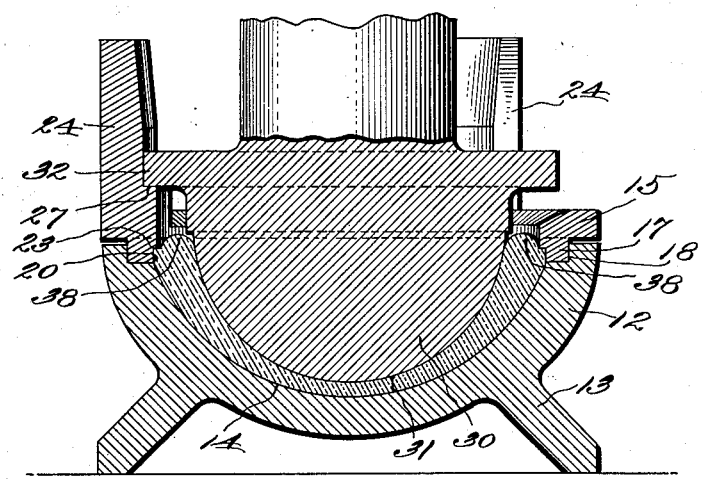
Figure 1 is a vertical sectional view showing a mold and a plunger seated therein, the parts being positioned in the position assumed at the end of the pressing operation.
Figure 2:
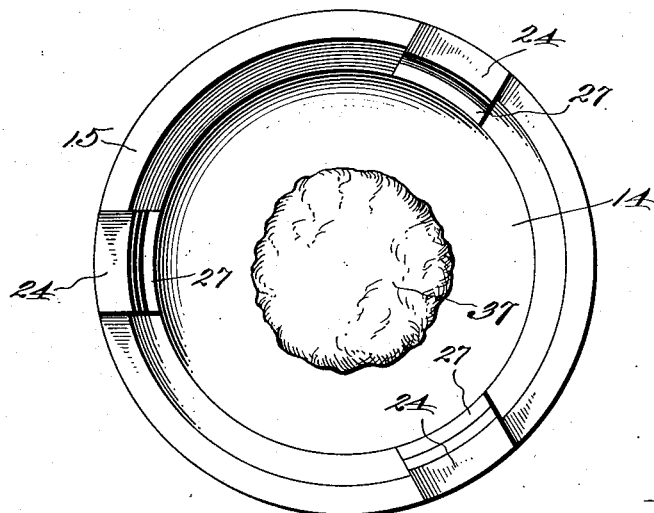
Figure 2 represents a plan view of a mold and neck ring with the plunger removed, an unpressed mold charge being indicated.

Referring more particularly to the drawing, the mold includes a body portion 12, a base 13 and the cavity 14.

The plunger is indicated at 30, and has a pressing surface 31.

In the operation of my invention, a mold charge 37 having been placed in the mold 12 in any desired manner, the plunger 30 is lowered to a predetermined position and allowed to dwell until the glass sets. As the plunger is lowered the glass flows up into the space between the plunger and the mold in the ordinary manner. The upper portion or zone 38 of the pressed blank, however, instead of contacting as is usual with the usual neck ring of the mold is left free in the space between the mold and the plunger, and out of contact with any part of the pressing mechanism. This zone is therefore unchilled, is in temperature higher than the temperature of any other part of the blank, and the shrinkage in volume which takes place as the pressure on the plunger is held, during its dwell, and as the blank cools, is replaced in those parts bounded by chilled walls by flow of glass from the zone 38, the walls of which are not chilled, and hence can readily collapse as the interior glass flows therefrom. Furthermore, the upper zone of the blank being free to occupy the unconfined space between the plunger and mold, while the blank in being pressed, is subject only to pressure necessary to overcome the viscosity of the glass in flowing into such space, with the result that the surfaces of the blank in contact with the mold and plunger are smooth and unmatted, in that the glass is not forced into the pores of the pressing members.

In order to guide the plunger and limit its movement into the mold, and also to facilitate removal of the blank from the mold, I utilize a ring 15, having a depending flange 17 engaging the corresponding recess 18 in the mold and thus preventing lateral displacement of the ring with reference to the mold. The flange 17 is preferably made deeper than the recess 18 to assure a tight fit along the line 20 on the interior of the mold.

The ring is provided with a suitable number of posts 24, which co-operate with a flange 32 on the plunger for aligning the latter, and the posts are provided each with a shoulder 27 against which the flange engages in limiting the downward movement of the plunger. The ring may be provided on the inner surface of its lower portion with a recess 23 to provide a finished surface on the outer and upper edge of the blank.

After the plunger and ring have been removed and the blank discharged from the mold and annealed, the contraction zone 38 can be removed by grinding in any well known manner, or it can be left in the shape assumed, due to its contraction, according to the requirements of the intended use of the blank.

Having thus described my invention what I claim as new, and desire to secure by Letters Patent is:—

1. The method of preventing "sucks" in a pressed glass blank which comprises confining the shrinkage of the blank to a zone having unpressed walls and forming an optically non-essential portion of the blank.

2. The method of preventing "sucks" in a pressed glass blank which consists in confining the contraction of the blank to an exposed zone out of contact with a molding surface, which zone forms no part of the optical surfaces of the blank.

3. The method of forming a glass blank having optical surfaces, consisting in pressing the blank while leaving free of mold contact and unchilled, a non-vital surface of the blank, and holding pressure while the glass is so plastic that the contraction of the glass bounded by the mold surfaces is made good by glass flowing from portions adjacent to the unchilled blank surface.

In testimony whereof I hereunto affix my signature.

STATES LEE LEBBY.